United States Patent

Okumura et al.

[11] Patent Number: 5,936,686
[45] Date of Patent: Aug. 10, 1999

[54] ACTIVE MATRIX TYPE LIQUID CRYSTAL DISPLAY

[75] Inventors: Haruhiko Okumura, Fujisawa; Tatsuo Saishu, Yokohama; Kohki Takatoh, Yokohama; Hiroyuki Nagata, Yokohama; Kouhei Suzuki, Yokohama; Masahiko Akiyama, Tokyo, all of Japan

[73] Assignee: Kabushiki Kaisha Toshiba, Kawasaki, Japan

[21] Appl. No.: 08/835,020

[22] Filed: Mar. 27, 1997

[30] Foreign Application Priority Data

Mar. 28, 1996 [JP] Japan .................................. 8-074467

[51] Int. Cl.$^6$ .................... G02F 1/1343; G02F 1/141; G09G 3/36
[52] U.S. Cl. ................ 349/38; 349/37; 349/39; 345/92
[58] Field of Search ................ 349/37, 38, 39; 345/205, 206, 97, 94, 92

[56] References Cited

U.S. PATENT DOCUMENTS

| | | | |
|---|---|---|---|
| 4,873,516 | 10/1989 | Castleberry | 340/784 |
| 5,151,803 | 9/1992 | Wakita et al. | 359/56 |
| 5,337,173 | 8/1994 | Atsumi et al. | 349/55 |
| 5,453,857 | 9/1995 | Takahara | 359/57 |
| 5,490,000 | 2/1996 | Tanaka et al. | 359/56 |
| 5,568,163 | 10/1996 | Okumura | 345/92 |
| 5,608,420 | 3/1997 | Okada | 345/89 |
| 5,686,932 | 11/1997 | Tomita | 345/92 |
| 5,691,783 | 11/1997 | Numao et al. | 349/37 |
| 5,694,145 | 12/1997 | Kondo et al. | 345/90 |
| 5,745,090 | 4/1998 | Kim et al. | 345/92 |

FOREIGN PATENT DOCUMENTS 8-15671  1/1996  Japan .

Primary Examiner—William L. Sikes
Assistant Examiner—Tarifur R. Chowdhury
Attorney, Agent, or Firm—Oblon, Spivak, McClelland, Maier & Neustadt, P.C.

[57] ABSTRACT

It is an object of this invention to provide an active matrix type liquid crystal display which uses a ferroelectric liquid crystal or antiferroelectric liquid crystal, which has a high response speed, a wide angle of field, and a high contrast, and which does not cause a "step response" phenomenon. An active matrix type liquid crystal display according to this invention includes pixel electrodes arranged in a matrix form, first switching devices arranged in a one-to-one correspondence with the pixel electrodes, signal lines for transmitting an image signal to the pixel electrodes via the first switching devices, scanning lines arranged to cross the signal lines to transmit a scanning signal for turning on the first switching devices, storage capacitance lines arranged parallel to the scanning lines to form storage capacitances between the storage capacitance lines and the pixel electrodes, and second switching devices arranged in a one-to-one correspondence with the pixel electrodes to connect pixel electrodes assigned to one scanning line to a storage capacitance line, while another scanning line is being selected, thereby resetting the pixel electrodes.

16 Claims, 6 Drawing Sheets

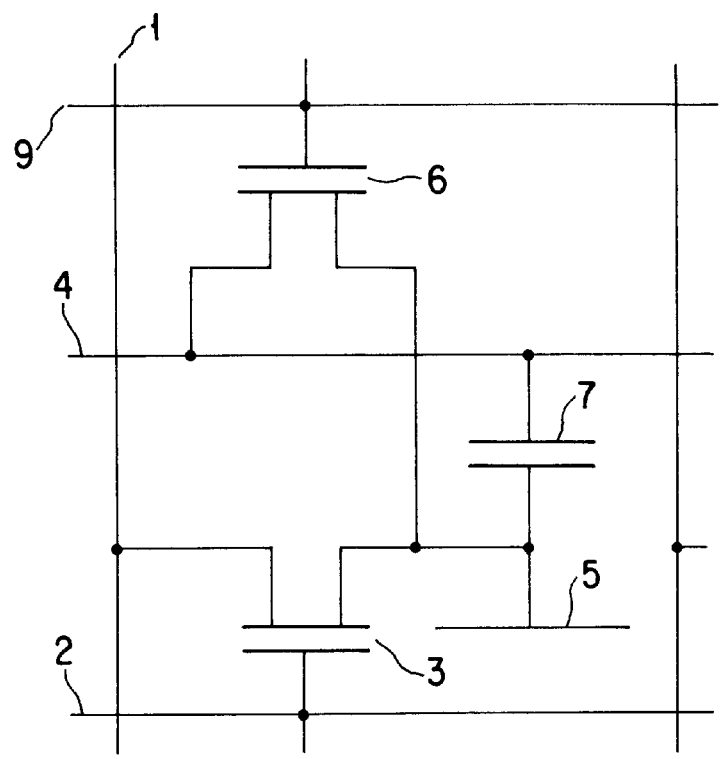
F I G. 2
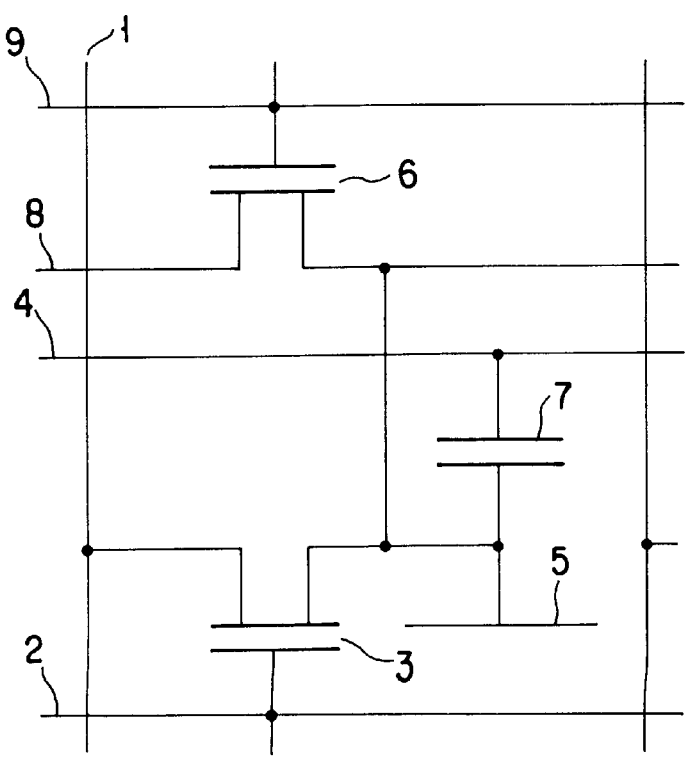
F I G. 4

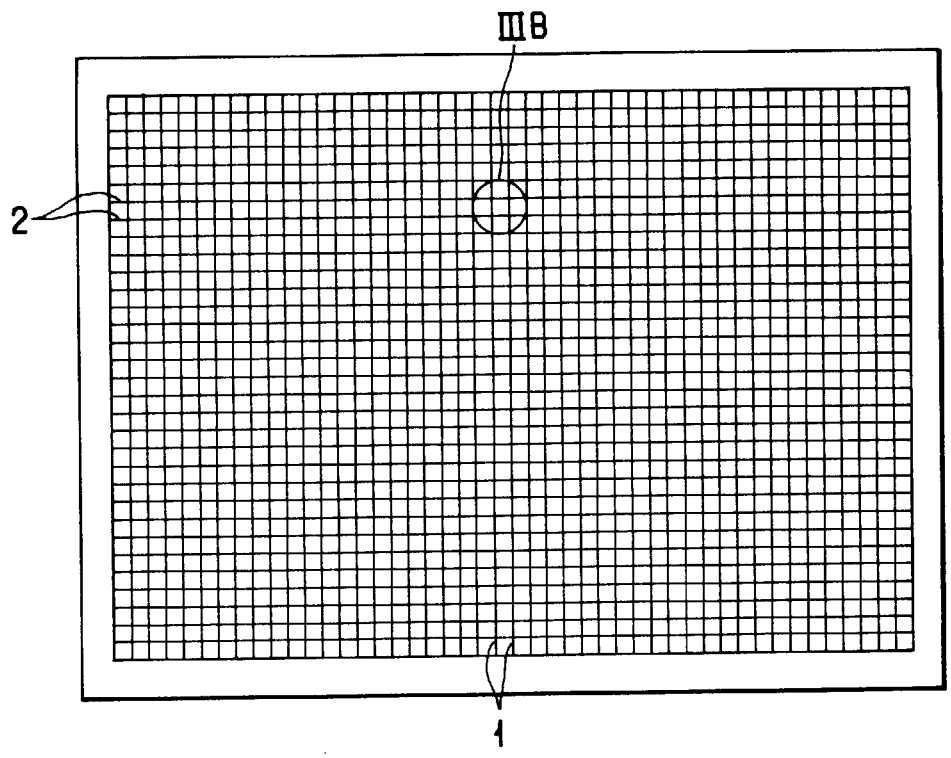
F I G. 3A
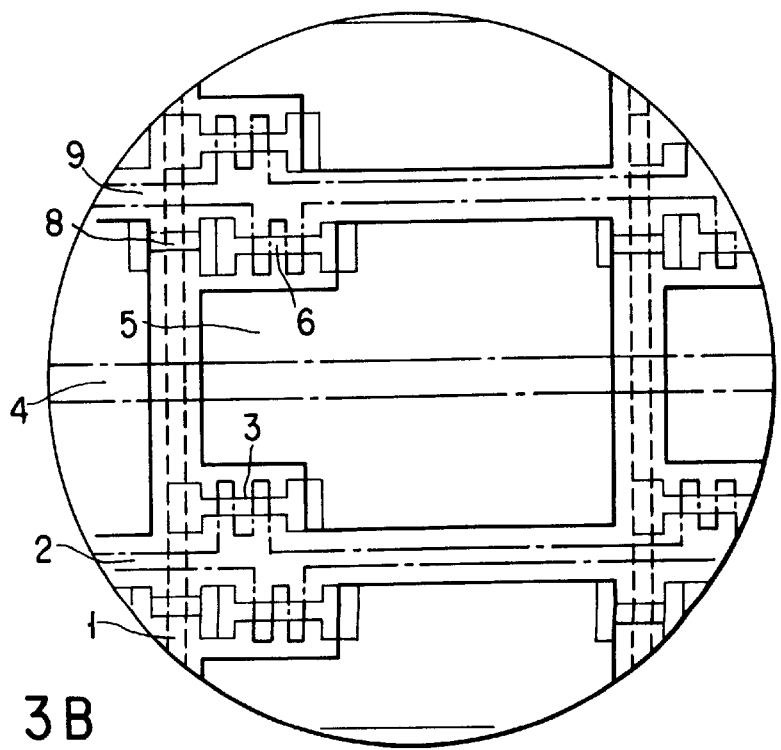
F I G. 3B

ACTIVE MATRIX TYPE LIQUID CRYSTAL DISPLAY

BACKGROUND OF THE INVENTION

The present invention relates to an active matrix type liquid crystal display using a ferroelectric liquid crystal or antiferroelectric liquid crystal.

Active matrix type liquid crystal displays using TFTs (Thin Film Transistors) as switching devices are widely used in personal computers, word processors, television sets, and the like. Recently, with increasing sizes of display panels of active matrix type liquid crystal displays, 21-inch display panels have been developed. Accordingly, demands for improvements of the resolution of display images are increasing.

To realize large-sized display screens and high-resolution display images, a liquid crystal material having a wide angle of view and a high response speed is required. As a liquid crystal material meeting these requirements, ferroelectric liquid crystal or antiferroelectric liquid crystal having a higher response speed and a wider angle of view than those of conventional twisted nematic liquid crystal has attracted attention.

It is known that when liquid crystal having spontaneous polarization such as a ferroelectric liquid crystal or antiferroelectric liquid crystal (representatively liquid crystal having a chiral smectic C phase or its secondary phase), is driven by using TFTs, if the write time is shorter than the response time of the liquid crystal, the holding voltage drops due to the influence of an antielectric field (Hartmann: J. Appl. Phys. 66, 1132 (1989)). This phenomenon of the holding voltage drop is called "insufficient write". The phenomenon decreases the effective applied voltage with respect to the liquid crystal and causes a decrease in the contrast ratio. Therefore, the phenomenon is a serious problem when these liquid crystal materials are used.

For example, when a liquid crystal is driven in an active matrix type liquid crystal display having a conventional array structure shown in FIG. 8A, if the liquid crystal does not completely respond within one horizontal period, accumulated charge is canceled by an inverting current produced inside a pixel by the motion of liquid crystal molecules. Consequently, as shown in FIG. 8B, the holding voltage is lowered (J. Appl. Phys. 66(3), Aug. 1, 1989). This phenomenon is a serious problem in the case of ferroelectric liquid crystal having memory properties (SSFLC: Surface Stabilized Ferroelectric Liquid Crystal), because the transmittance of the liquid crystal changes. As described above, brightness changes when a ferroelectric liquid crystal which has an insufficient response speed, e.g., which does not completely respond within one horizontal period, is used in an active matrix type liquid crystal display having a conventional array structure.

Also, as another problem of the use of a ferroelectric liquid crystal or antiferroelectric liquid crystal, it is known that when the absolute value of a signal voltage changes from a certain frame period, a liquid crystal cell repetitively brightens and darkens over several frame periods and settles in a steady transmitted light quantity (this phenomenon is called "step response") (Verhulst et al.: IDRC '94 digest, 377 (1994)).

The above problem is solved when the response speed is made shorter than the write time by using a liquid crystal material with a sufficient response speed. At present, however, no liquid crystal material is known which satisfies this condition when a liquid crystal is driven at a low voltage or temperature slightly lower than room temperature. In particular, it is considered doubtful whether a high response speed at low temperatures is realized even in the future. Additionally, to accomplish a large screen and a high resolution of a liquid crystal display, it is essential to shorten one horizontal period. Therefore, it is difficult to solve the above problem only by improving a liquid crystal material.

As one solution for the step response, a method is known which performs a reset operation for writing 0 V in a pixel electrode immediately before a signal is written. Several variations of this method using a TFT or a TFD (Thin Film Diode) have been proposed. In these methods, a part of the write time is assigned to the reset operation. This solves the problem of the step response. However, the effective write time is reduced, and this worsen the problem of the insufficient write. Consequently, the contrast ratio cannot be satisfactorily improved.

The problem of the insufficient write is worsened when one horizontal period is shortened to realize a high resolution and at the same time the write time is further shortened by the reset operation. Note that if TFDs are used, the reset operation can also be performed while another line is being written. However, TFDs are unsuitable to be put into practical use because it is difficult to decrease variations of the device characteristics in one display panel.

As described above, when a liquid crystal material consisting of a ferroelectric liquid crystal or antiferroelectric liquid crystal is used, no conventional array structures can solve the problem of the insufficient write resulting from an antielectric field and the problem of the step response. Also, the conventional reset methods worsen the problem of the insufficient write resulting from an antielectric field, although they can eliminate the problem of the step response.

BRIEF SUMMARY OF THE INVENTION

It is the first object of the present invention to provide a liquid crystal display which has a high contrast ratio and does not cause a step response phenomenon in an active matrix type liquid crystal display which uses a ferroelectric liquid crystal or antiferroelectric liquid crystal having a high response speed and a wide angle of view.

It is the second object of the present invention to provide a liquid crystal display which does not largely decrease the holding voltage and therefore has a high contrast ratio even when a ferroelectric liquid crystal or antiferroelectric liquid crystal having an insufficient response speed is used.

An active matrix type liquid crystal display according to the present invention comprises:

pixel electrodes arranged in a matrix form;

switching devices arranged in a one-to-one correspondence with the pixel electrodes;

signal lines for supplying an image signal to the pixel electrodes via the switching devices;

scanning lines arranged to cross the signal lines each scanning line being configured to supply a scanning signal for turning on assigned ones of the switching devices to enable the supplying of the image signal to assigned pixel electrodes; and reset means for resetting pixel electrodes assigned to one scanning line while another scanning line is supplying the scanning signal.

In the active matrix type liquid crystal display according to the present invention, while one scanning line is being selected, pixel electrodes assigned to another scanning line are reset. Therefore, a step response phenomenon can be prevented without sacrificing a data write time during the selection period. As a consequence, high-quality images with a high contrast ratio are achieved.

According to one preferred embodiment of the active matrix type liquid crystal display of the present invention, second switching devices are arranged in a one-to-one correspondence with the pixel electrodes, and the pixel electrodes are connected to storage capacitance lines via the second switching devices. While one scanning line is being selected, pixel electrodes assigned to another scanning line are reset by the second switching devices.

Preferably, while one scanning line is being selected, the second switching devices connect pixel electrodes assigned to a scanning line adjacent to the selected scanning line and to be selected next, to a storage capacitance line.

More preferably, while one scanning line is being selected, the second switching devices are turned on by a scanning signal supplied from the selected scanning line and connect pixel electrodes assigned to a scanning line adjacent to the selected scanning line and to be selected next, to a storage capacitance line.

According to another preferred embodiment of the active matrix type liquid crystal display of the present invention, second switching devices are arranged in a one-to-one correspondence with the pixel electrodes, and the pixel electrodes are interconnected via the second switching devices. While one scanning line is being selected, pixel electrodes assigned to another scanning line are reset by the second switching devices.

Preferably, while one scanning line is being selected, the second switching devices interconnect pixel electrodes assigned to a scanning line adjacent to the selected scanning line and to be selected next.

More preferably, while one scanning line is being selected, the second switching devices are turned on by a scanning signal supplied from the selected scanning line and interconnect pixel electrodes assigned to a scanning line adjacent to the selected scanning line and to be selected next.

In the above active matrix type liquid crystal display, a liquid crystal material having spontaneous polarization is used as a liquid crystal layer. A liquid crystal material having a chiral smectic C phase or its secondary phase is typically used as a liquid crystal layer.

An active matrix type liquid crystal display according to the present invention is driven by a signal line inversion driving system or dot inversion driving system and comprises:

pixel electrodes arranged in a matrix form;

switching devices arranged in a one-to-one correspondence with the pixel electrodes;

signal lines for supplying an image signal to the pixel electrodes via the switching devices; and scanning lines arranged to cross the signal lines to supply a scanning signal for turning on the switching devices, wherein a plurality of the pixel electrodes are each coupled with pixel electrodes adjacent thereto in a scanning line direction via a series connected capacitance element.

In the active matrix type liquid crystal display device according to the present invention, pixel electrodes adjacent to each other and inversion-driven are coupled with each other via a capacitance element. Therefore, an inverting current produced by spontaneous polarization of the liquid crystal of one pixel and an inverting current produced by spontaneous polarization of the liquid crystal of the other pixel compensate for each other, and this suppresses a holding voltage drop. Consequently, high-quality images with a high contrast are achieved.

Analogously, in an active matrix type liquid crystal display driven by a scanning line inversion driving system or dot inversion driving system, a plurality of pixel electrodes are coupled similary each with pixel electrodes adjacent thereto in a signal line direction via a series connected capacitance element.

Analogously, in an active matrix type liquid crystal display driven by a dot inversion driving system, pixel electrodes are coupled with pixel electrodes adjacent in a diagonal direction via capacitance elements.

In the above active matrix type liquid crystal display, a liquid crystal material having spontaneous polarization is used as a liquid crystal layer. A liquid crystal material having a chiral smectic C phase or its secondary phase is typically used as a liquid crystal layer.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a circuit diagram of the liquid crystal display shown in FIG. 1;

FIGS. 3A and 3B are schematic views showing a liquid crystal display according to the present invention having an array structure in which adjacent pixel electrodes are coupled with each other via a reset switching device;

FIG. 4 is a circuit diagram of the liquid crystal display shown in FIG. 3;

DETAILED DESCRIPTION OF THE INVENTION

EXAMPLE 1

Figure 1A:
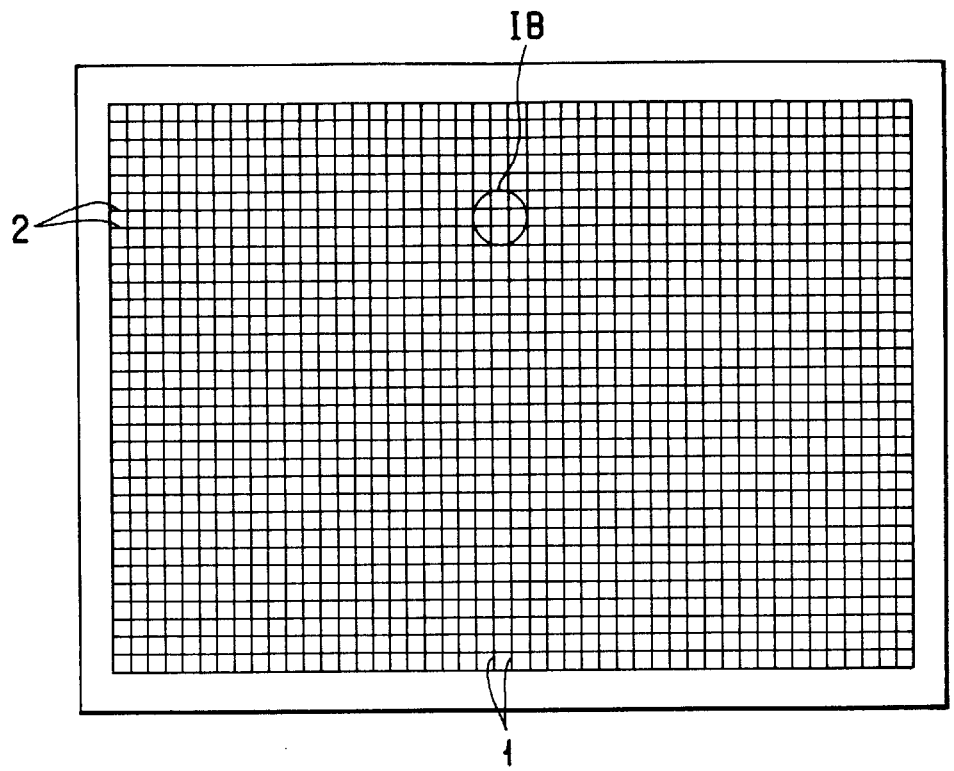
FIGS. 1A and 1B are schematic views showing a liquid crystal display according to the present invention having an array structure in which a pixel electrode is connected to a storage capacitance line via a reset switching device.
Figure 1B:
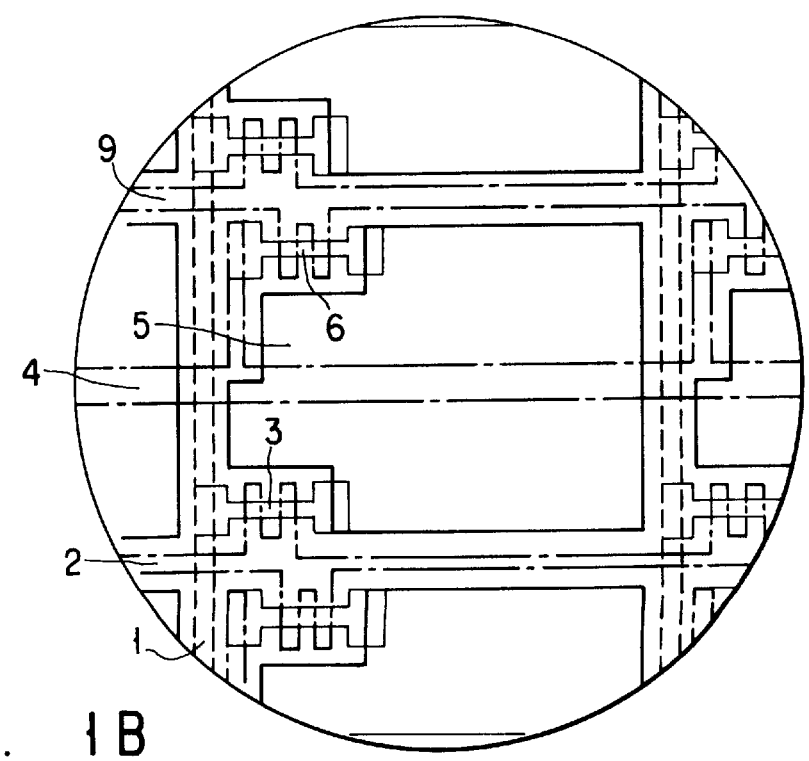

FIGS. 1A and 1B show the first embodiment of the array structure of a liquid crystal display according to the present invention. FIG. 2 is a circuit diagram of this array structure.

In the first embodiment, each pixel electrode 5 has a reset switching device 6 and is connected to a storage capacitance line 4 via this reset switching device 6. That is, as shown in the circuit diagram of FIG. 2, a signal line 1 and the pixel electrode 5 are connected via a TFT 3 which is turned on by a scanning signal supplied from a scanning line 2. A storage capacitance 7 is formed between the pixel electrode 5 and the storage capacitance line 4. Additionally, the pixel electrode 5 and the storage capacitance line 4 are connected via a reset TFT 6 which is turned on by a scanning signal supplied from a scanning line 9 which is selected previously. The storage capacitance line 4 is connected to a common electrode at the edge of a display area.

In the above structure, when the reset TFT 6 is turned on, the pixel electrode 5 is connected to the storage capacitance line 4. In this embodiment, an extra scanning line exclusively used to drive the reset TFT is necessary outside the scanning line positioned in the endmost portion of the display area and selected first.

EXAMPLE 2

FIGS. 3A and 3B show the second embodiment of the array structure of a liquid crystal display according to the present invention. FIG. 4 is a circuit diagram of this array structure.

In the second embodiment, each pixel electrode 5 has a reset switching device 6 and is connected to an adjacent pixel electrode via this reset switching device 6. That is, as shown in the circuit diagram of FIG. 4, a signal line 1 and the pixel electrode 5 are connected via a TFT 3 which is turned on by a scanning signal supplied from a scanning line 2. A storage capacitance 7 is formed between the pixel electrode 5 and a storage capacitance line 4. Additionally, the pixel electrode 5 and its adjacent pixel electrode are interconnected via a reset TFT 6 and a pixel electrode interconnecting line 8. The reset TFT 6 is turned on by a scanning signal supplied from a scanning line 9 which is selected previously. A pixel electrode arranged in the endmost portion of a display area is connected to a common electrode via the reset TFT.

With this structure, the pixel electrodes 5 assigned to the same scanning line 2 are connected in series with each other via the reset TFTs 6 and the pixel electrode interconnecting line 8. In this second embodiment, as in the first embodiment described above, an extra scanning line exclusively used to drive the reset TFT is necessary outside the scanning line positioned in the endmost portion of the display area and selected first.

In the above structure, when the reset TFTs 6 are turned on, the pixel electrodes assigned to the same scanning line are connected in series with each other and connected to the common electrode at the end of the line.

The characteristic feature of the first and second embodiments of the present invention is that while one scanning line is being selected, pixels assigned to another scanning line are reset. That is, when one scanning line is selected, data is written in pixels assigned to the selected scanning line and at the same time pixels assigned to a scanning line to be selected next are reset. Since this obviates the need to assign a part of the data write period to the reset operation, a sufficient data write period can be achieved. As a consequence, the problem of step response is eliminated and a high contrast ratio is achieved. Accordingly, the resolution of the liquid crystal display can be increased.

In the first and second embodiments of the present invention, a remarkable effect is obtained when a liquid crystal having a chiral smectic C phase or its secondary phase, e.g., a ferroelectric liquid crystal or antiferroelectric liquid crystal, is used as a liquid crystal material. This is so because the structures of these embodiments decrease an inverting current associated with inversion of spontaneous polarization which is a problem when these liquid crystal materials are used. The secondary phase of the chiral smectic C phase herein mentioned means a ferroelectric phase (Sc*), an antiferroelectric phase (Sc$_A$*), a ferrielectric phase (Scγg*), and other phases (e.g., Scα*, Scβ*, FI$_H$, FI$_L$, AF, and Sc$_I$*). However, the first and second embodiments of the present invention are also applicable to a liquid crystal material of another display mode.

In the first and second embodiments of the present invention, it is preferable to use so-called signal line inversion driving in which the polarities of image signals of adjacent signal lines are made opposite to each other. The use of the signal line inversion driving prevents flicker noise even if the characteristic of applied voltage vs. light transmittance is not completely symmetrical about 0 V. Additionally, in the signal line inversion driving, the reset operation can be performed without using any power supply by short-circuiting all pixel electrodes on the next and subsequent scanning lines to be selected. Consequently, the consumption power can be reduced compared to a reset method in which a reset voltage is written from a power supply.

EXAMPLE 3

The third embodiment of the present invention will be described below.

Figure 5A:
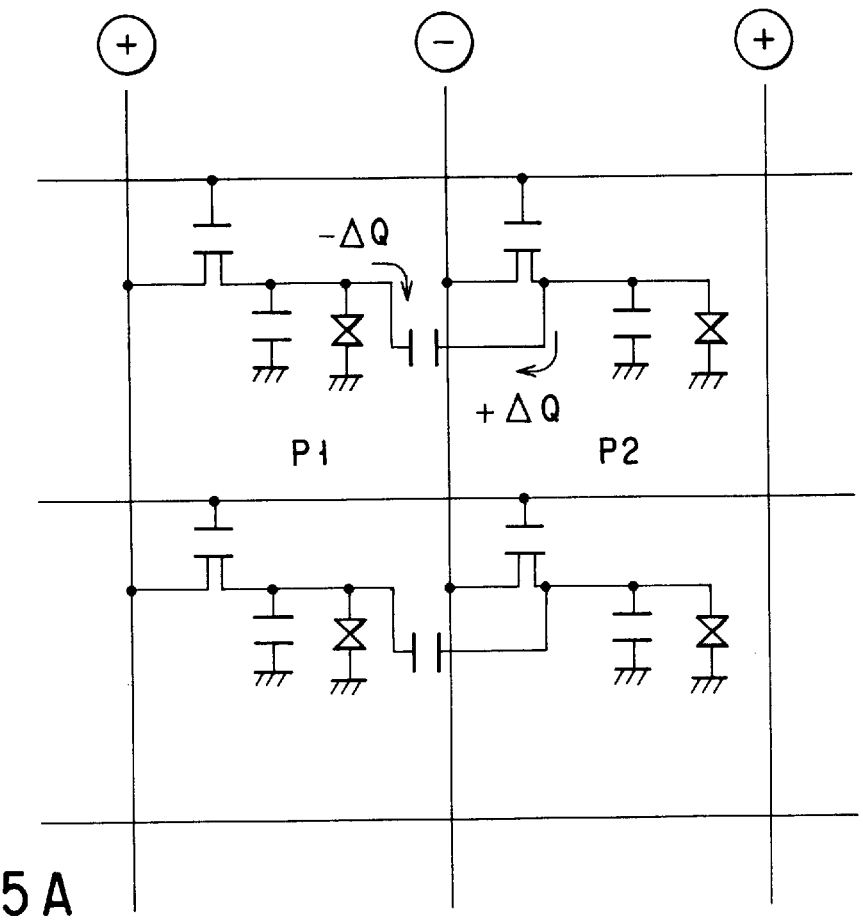
FIG. 5A is a circuit diagram showing one embodiment of a liquid crystal display according to the present invention having an array structure in which adjacent pixel electrodes are coupled with each other via a capacitance element.

FIG. 5A shows the third embodiment of the array structure of a liquid crystal display according to the present invention. In this embodiment, the liquid crystal display is driven on the basis of a signal line inversion driving system or dot inversion driving system in order to reduce flicker noise. That is, adjacent pixels are given image signals of opposite polarities.

Figure 5B:
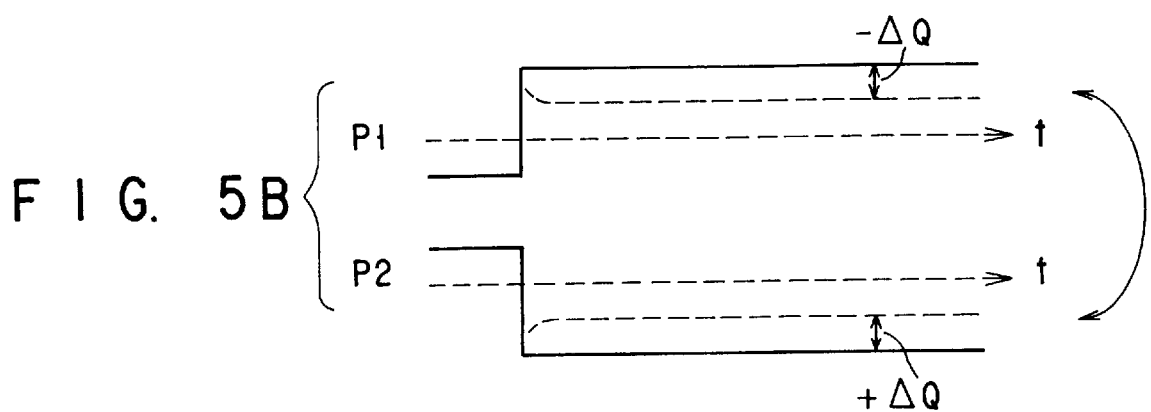
FIG. 5B is a view showing a change with time of the holding voltage applied on liquid crystal in the liquid crystal display shown in FIG. 5A.

In the array structure of the third embodiment, each pixel electrode is coupled with a pixel electrode adjacent along a scanning line (i.e., in a horizontal direction) via a capacitance Cc, i.e., these pixel electrodes are AC-coupled. When pixel electrodes thus coupled with each other via a capacitance element are driven with opposite polarities, inverting currents flow in opposite directions in these adjacent pixel electrodes and compensate for the respective charges. Consequently, as shown in FIG. 5B, no holding current drop phenomenon appears. Charges are completely compensated for if the absolute values of signal voltages applied to the adjacent pixel electrodes are completely the same. However, if the absolute values are not completely the same, a portion which is not compensated remains in accordance with the difference between the absolute values of the signal voltages. Since, however, even when signal voltages are completely different, e.g., white and black, their polarities are opposite. Therefore, charges are not compensated in opposite directions. Accordingly, the structure shown in FIG. 5A is superior to conventional structures in characteristics such as a contrast ratio.

EXAMPLE 4

Figure 6:
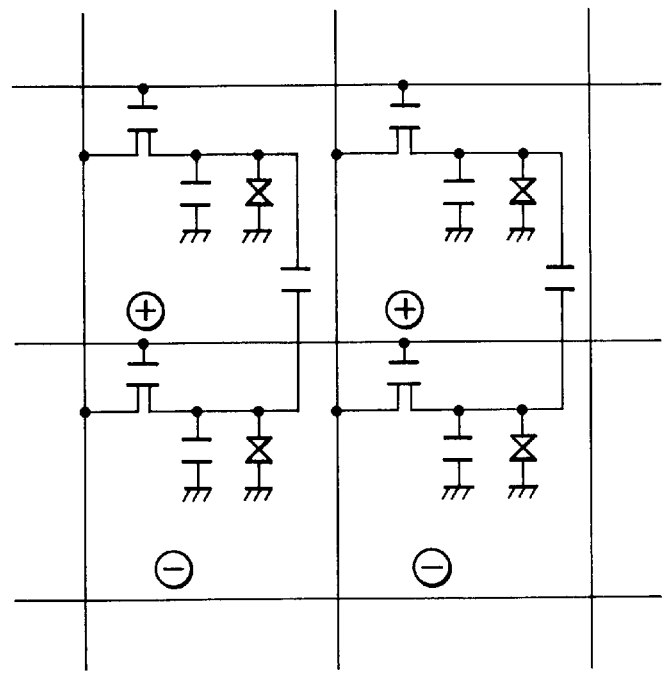
FIG. 6 is a circuit diagram showing another embodiment of the liquid crystal display according to the present invention having an array structure in which adjacent pixel electrodes are coupled with each other via a capacitance element.

FIG. 6 shows the fourth embodiment of the array structure of a liquid crystal display according to the present invention. In this embodiment, the liquid crystal display is driven on the basis of a scanning line inversion driving system (line inversion driving system) or dot inversion driving system. That is, pixels adjacent to each other along a signal line (in a vertical direction) are given image signals of opposite polarities.

In the array structure of the fourth embodiment, each pixel electrode is coupled with a pixel electrode adjacent along a signal line (i.e., in a vertical direction) via a capacitance Cc. In this arrangement, driving timings for positive and negative polarities are different in one horizontal period. However, no problem arises when pixels compensating for each other are driven at a sufficiently short interval so that a change amount of liquid crystal molecules is small between the pixels.

EXAMPLE 5

Figure 7:
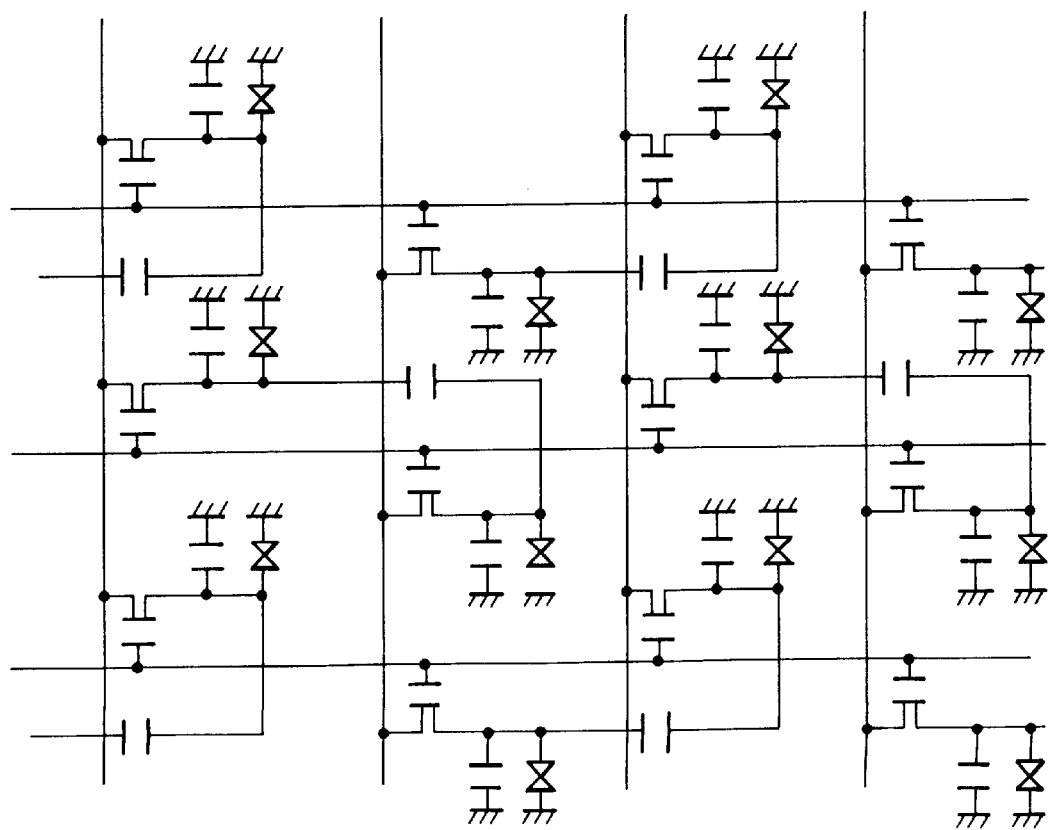
FIG. 7 is a circuit diagram showing a liquid crystal display according to the present invention having an array structure in which adjacent pixel electrodes are AC-coupled with each other via a capacitance element.
Figure 8A:
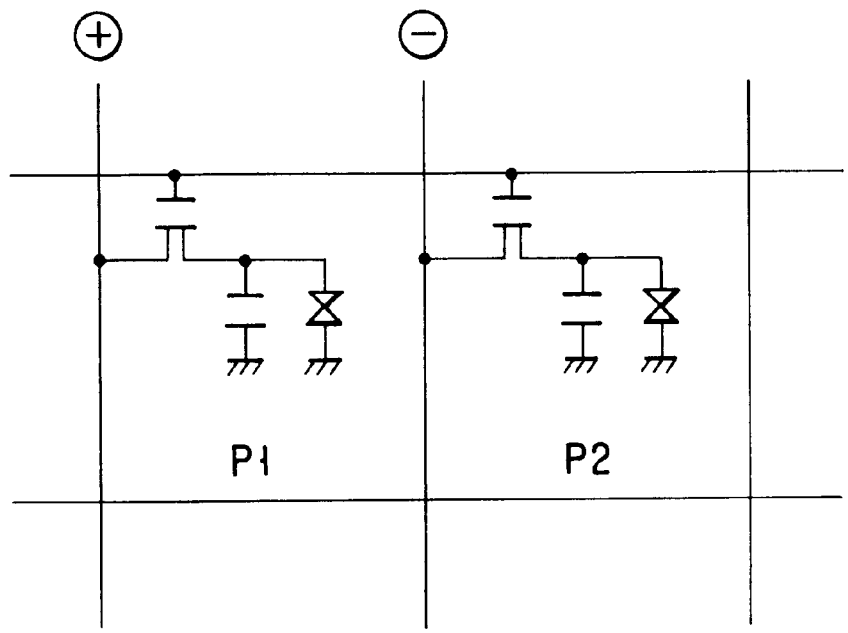
FIG. 8A is a circuit diagram of a liquid crystal display having a conventional array structure.
Figure 8B:
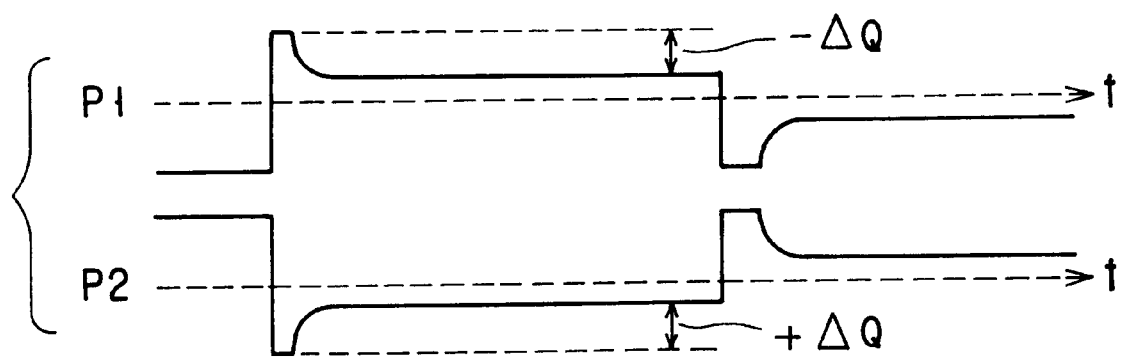
FIG. 8B shows a change with time of the holding voltage applied on liquid crystal in the liquid crystal display shown in FIG. 8A.

FIG. 7 shows the fifth embodiment of the array structure of a liquid crystal display according to the present invention. In this embodiment, the liquid crystal display is driven on the basis of a dot inversion driving system, and pixels adjacent to each other in a diagonal direction are given image signals of opposite polarities.

In the array structure of the fifth embodiment, each pixel electrode is coupled with a pixel electrode adjacent along a diagonal direction via a capacitance Cc. The characteristic of this embodiment is the same as the fourth embodiment.

The third to fifth embodiments of the present invention are characterized in that each pixel electrode is coupled with an adjacent pixel electrode via a capacitance element. Since individual pixel electrodes are thus coupled, no DC component is transmitted between these pixel electrodes, and only an AC component is transmitted. In each of these embodiments, adjacent pixel electrodes coupled with each other via a capacitance element are given image signals of opposite polarities. Consequently, inverting currents are compensated for when the correlation between the image signals supplied to the adjacent pixel electrodes is high. Even if there is no correlation, at least currents having opposite polarities flow. Therefore, a reduction amount of the holding voltage caused by an inverting current is suppressed compared to a structure which is driven by a conventional method. Consequently, a voltage change of a pixel electrode which appears after a voltage holding state starts can be compensated for by a voltage change of the adjacent pixel electrode. In these embodiments, the driving voltage can also be reduced because adjacent pixel electrodes compensate for their respective charges.

In the third to fifth embodiments of the present invention, it is preferable to use a liquid crystal having a chiral smectic C phase or its secondary phase as a liquid crystal material. This is because an inverting current is a problem unique to a ferroelectric liquid crystal. However, even when the present invention is applied to a twisted nematic liquid crystal, an effect of compensation of a leakage current can be obtained.

The results of the tests conducted to confirm the performance of the liquid crystal displays according to the present invention will be described below. Of the following tests, Tests 1 and 5 describe the results of the tests of the liquid crystal display of the first embodiment of the present invention. Test 2 describes the result of the test of the liquid crystal display of the second embodiment of the present invention. The remaining tests describe the results of the tests conducted for comparison.

(Test 1)

A liquid crystal display having the array structure shown in FIG. 1 was manufactured. Non-threshold antiferroelectric liquid crystal A (Fukuda: Asia Display, 95 digest: 61 (1995)) having a spontaneous polarization of 150 nc/cm$^2$, a response time of 100 $\mu$s, and a saturation voltage of 5 V was used as a liquid crystal material, and TFTs were used as switching devices. As a TFT driving system, VGA in which a maximum applied voltage was ±6 V and a one-line selection period was 64 $\mu$s was used.

This liquid crystal display was driven by a method in which one scanning line was selected and at the same time pixel electrodes assigned to the next scanning line were reset. The reset operation was done by using a common electrode.

As a consequence, a contrast ratio of 30:1 was obtained, and no afterimage resulting from step response was found.

(Test 2)

A liquid crystal display having the array structure shown in FIG. 3 was manufactured. The same liquid crystal material, switching devices, and the driving system as in Test 1 were used.

This liquid crystal display was driven by a method in which one scanning line was selected and at the same time pixel electrodes assigned to the next scanning line were reset and by a method of performing signal line inversion driving by which the polarities of image signals supplied from adjacent signal lines were made opposite to each other.

As a consequence, a contrast ratio of 28:1 was obtained, and no afterimage resulting from step response was found.

In this liquid crystal display, TFTs whose ON resistance is about 1 MΩ are connected in series in a row direction (a direction of scanning lines), so the resistance of the whole line to be reset is large. Accordingly, no reset voltage can be supplied from the inter-connecting line (the pixel electrode inter-connecting line 8) of the pixel electrode in the endmost portion of the display area. However, the resetting effect can be obtained by making the polarities of image signals supplied to adjacent pixel electrodes opposite to each other by signal line inversion driving, since the adjacent pixels compensate for their respective charges. This is an imperfect reset operation compared to the one shown in FIG. 1, but a practically satisfactory effect is obtained. Also, since essentially no reset voltage is supplied from an external circuit, the consumption power is effectively reduced.

(Test 3)

For comparison, a liquid crystal display having a conventional array structure including one TFT for each pixel was manufactured. The same liquid crystal material, switching devices, and driving system as in Test 1 were used. This liquid crystal device was driven by a normal method performing no reset operation.

As a consequence, the contrast ratio was as low as 10:1, and an afterimage resulting from step response was found.

(Test 4)

For comparison, a liquid crystal display having a conventional array structure including one TFT for each pixel was manufactured. The same liquid crystal material, switching devices, and driving system as in Test 1 were used. This liquid crystal display was driven by a method in which the first half of a one-line selection period was allocated to a reset operation.

As a consequence, although no afterimage resulting from step response was found, only a value of about 20:1 was obtained as the contrast ratio.

(Test 5)

A liquid crystal display having the array structure shown in FIG. 1 was manufactured. Deformed helix-ferroelectric liquid crystal B (DHF liquid crystal) having a spontaneous polarization of 150 nc/cm$^2$, a response time of 100 $\mu$s, and a saturation voltage of 5 V was used as a liquid crystal material, and TFTs were used as switching devices. As a TFT driving system, VGA in which a maximum applied voltage was ±6 V and a one-line selection period was 64 $\mu$s was used. Note that the DHF liquid crystal differs from non-threshold antiferroelectric liquid crystal A described above in that the relationship between the applied voltage and the light transmittance is asymmetrical about 0 V.

This liquid crystal display was driven by a method in which one scanning line was selected and at the same time pixel electrodes assigned to the next scanning line were reset and by a method of performing signal line inversion driving by which the polarities of image signals supplied from adjacent signal lines were made opposite to each other.

As a consequence, a contrast ratio of 30:1 was obtained, and neither afterimage resulting from step response nor flicker noise was found.

(Test 6)

A liquid crystal display having the array structure shown in FIG. 1 was manufactured. The same liquid crystal material, switching devices, and the driving system as in Test 5 were used.

For comparison, this liquid crystal display was driven only by a method in which one scanning line was selected and at the same time pixel electrodes assigned to the next scanning line were reset, without performing any signal line inversion driving.

As a consequence, a contrast ratio of 30:1 was obtained, and no afterimage resulting from step response was found. However, flicker noise appeared, and the consumption power increased by about 20% compared to that in Test 5.

(Test 7)

For comparison, a liquid crystal display device was manufactured under the same conditions as in Test 1 except that TFDs were used as switching devices.

This liquid crystal display was driven by a method in which one scanning line was selected and at the same time pixel electrodes assigned to the next scanning line were reset.

As a consequence, a contrast ratio of 30:1 was obtained, and no afterimage resulting from step response was found. However, display images were found to be nonuniform due to variations in the characteristics of the TFDs.

The present invention is not limited to the embodiments described above and can be practiced in the form of various modifications.

As a switching device, a TFT, a TFD, and an MIM can be used. Especially when a TFT is used, a liquid crystal display with a high reliability and a high display uniformity can be realized without using any countermeasure for compensating for variations of device characteristics.

As a substrate, it is possible to use a glass substrate, a plastic substrate, a resin film, or the like. As the materials of an orientation film, electrodes, a spacer, and a seal, those commonly used in liquid crystal displays can be used.

In the first and second embodiments of the present invention, each pixel electrode includes, in addition to a data write switching device, a reset switching device for performing a reset operation by which pixel electrodes assigned to one scanning line are reset while another scanning line is being selected. This eliminates the problem of step response. Therefore, a high contrast is secured even when the display is driven at a low voltage. Additionally, flicker noise is prevented and the consumption power is reduced.

In the third to fifth embodiments of the present invention, adjacent pixel electrodes are coupled with each other via a capacitance element. Therefore, when a ferroelectric liquid crystal is driven, for example, enough charges to compensate for inverting currents can be supplied to these adjacent pixel electrodes. Consequently, it is possible to prevent a holding voltage drop and greatly reduce the degradation of the response characteristic being due to the temperature characteristic of the inverting current.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An active matrix type liquid crystal display comprising:
   pixel electrodes arranged in a matrix form;
   switching devices arranged in a one-to-one correspondence with said pixel electrodes;
   signal lines for supplying an image signal to said pixel electrodes via said switching devices;
   scanning lines arranged to cross said signal lines, each scanning line being configured to supply a scanning signal for turning on assigned ones of said switching devices to enable the supplying of the image signal to assigned pixel electrodes; and
   reset means for resetting pixel electrodes assigned to one scanning line while another scanning line is supplying the scanning signal.

2. A display according to claim 1, wherein a liquid crystal material having spontaneous polarization is used as a liquid crystal layer.

3. A display according to claim 1, wherein a liquid crystal material having a chiral smectic C phase or a secondary phase thereof is used as a liquid crystal layer.

4. An active matrix type liquid crystal display comprising:
   pixel electrodes arranged in a matrix form;
   first switching devices arranged in a one-to-one correspondence with said pixel electrodes;
   signal lines for supplying an image signal to said pixel electrodes via said first switching devices;
   scanning lines arranged to cross said signal lines to supply a scanning signal for turning on said first switching devices;
   storage capacitance lines arranged parallel to said scanning lines to form storage capacitances between said storage capacitance lines and said pixel electrodes; and
   second switching devices arranged in a one-to-one correspondence with said pixel electrodes to connect pixel electrodes assigned to one scanning line to a storage capacitance line, while another scanning line is being selected, thereby resetting said pixel electrodes.

5. A display according to claim 4, wherein while one scanning line is being selected, said second switching devices connect pixel electrodes assigned to a scanning line adjacent to said selected scanning line and to be selected next, to a storage capacitance line.

6. A display according to claim 4, wherein while one scanning line is being selected, said second switching devices are turned on by a scanning signal supplied from said selected scanning line, and connect pixel electrodes assigned to a scanning line adjacent to said selected scanning line and to be selected next, to a storage capacitance line.

7. A display according to any one of claims 4 to 6, wherein a liquid crystal material having spontaneous polarization is used as a liquid crystal layer.

8. A display according to any one of claims 4 to 6, wherein a liquid crystal material having a chiral smectic C phase or a secondary phase thereof is used as a liquid crystal layer.

9. An active matrix type liquid crystal display comprising:

pixel electrodes arranged in a matrix form;

first switching devices arranged in a one-to-one correspondence with said pixel electrodes;

signal lines for supplying an image signal to said pixel electrodes via said first switching devices;

scanning lines arranged to cross said signal lines to supply a scanning signal for turning on said first switching devices; and second switching devices arranged in a one-to-one correspondence with said pixel electrodes to inter-connect pixel electrodes assigned to one scanning line, while another scanning line is being selected, thereby resetting said pixel electrodes.

10. A display according to claim 9, wherein while one scanning line is being selected, said second switching devices interconnect pixel electrodes assigned to a scanning line adjacent to said selected scanning line and to be selected next.

11. A display according to claim 9, wherein while one scanning line is being selected, said second switching devices are turned on by a scanning signal supplied from said selected scanning line and interconnect pixel electrodes assigned to a scanning line adjacent to said selected scanning line and to be selected next.

12. A display according to any one of claims 9 to 11, wherein a liquid crystal material having spontaneous polarization is used as a liquid crystal layer.

13. A display according to any one of claims 9 to 11, wherein a liquid crystal material having a chiral smectic C phase or a secondary phase thereof is used as a liquid crystal layer.

14. An active matrix type liquid crystal display driven by a dot inversion driving system, comprising:

pixel electrodes arranged in a matrix form;

switching devices arranged in a one-to-one correspondence with said pixel electrodes;

signal lines for supplying an image signal to said pixel electrodes via said switching devices; and scanning lines arranged to cross said signal lines to supply a scanning signal for turning on said switching devices, wherein said pixel electrodes are coupled with pixel electrodes adjacent in a diagonal direction via capacitance elements.

15. A display according to any one of claims 14 to 16, wherein a liquid crystal material having spontaneous polarization is used as a liquid crystal layer.

16. A display according to any one of claims 14 to 16, wherein a liquid crystal material having a chiral smectic C phase or a secondary phase thereof is used as a liquid crystal layer.

* * * * *